United States Patent [19]

Ueki

[11] Patent Number: 4,664,426
[45] Date of Patent: May 12, 1987

[54] RETAINER RING FOR COUPLING TOGETHER WATER SUPPLY PIPES OR THE LIKE

[75] Inventor: Noboru Ueki, Isezaki, Japan
[73] Assignee: Kanto Chuutetsu Kabushiki Kaisha, Gunma, Japan
[21] Appl. No.: 770,235
[22] Filed: Aug. 28, 1985
[30] Foreign Application Priority Data
  Sep. 6, 1984 [JP] Japan .................. 59-135616[U]
  Jun. 24, 1985 [JP] Japan .................. 60-95645[U]
[51] Int. Cl.⁴ .......................................... F16L 19/00
[52] U.S. Cl. ................................ 285/337; 285/343; 403/366
[58] Field of Search ............... 285/337, 339, 343; 403/355, 366; 279/76

[56] References Cited
  U.S. PATENT DOCUMENTS
  2,868,576  1/1959  Boughton .................. 285/337
  4,417,754 11/1983  Vamaji et al. ............. 285/337

FOREIGN PATENT DOCUMENTS
  1249115 11/1960 France .................. 285/337

Primary Examiner—Richard J. Scanlan, Jr.
Assistant Examiner—Douglas W. Hanson
Attorney, Agent, or Firm—Parkhurst & Oliff

[57] ABSTRACT

A retaining piece 6 is urged against a pipe A by a push bolt 5, which has an inclined engagement surface 20 in forced engagement with a complementarily inclined engagement surface 16 of a push bolt insertion hole 14. When the pipe A experiences a force tending to dislocate it, the piece 6 is turned such that a ridge-like edge 25 formed at the bottom 23 of the piece 6 wedges into the pipe A, thus preventing the dislocation of the pipe A. The bottom 23 of the piece 6 and also ridge-like edges 24 and 25 formed at the bottom have curved shapes conforming to the outer periphery of the pipe A, so that the edges 24 and 25 can be readily in close contact with the pipe outer periphery. The piece 6 is retained in a ring body 4 by a retainer 7.

1 Claim, 18 Drawing Figures

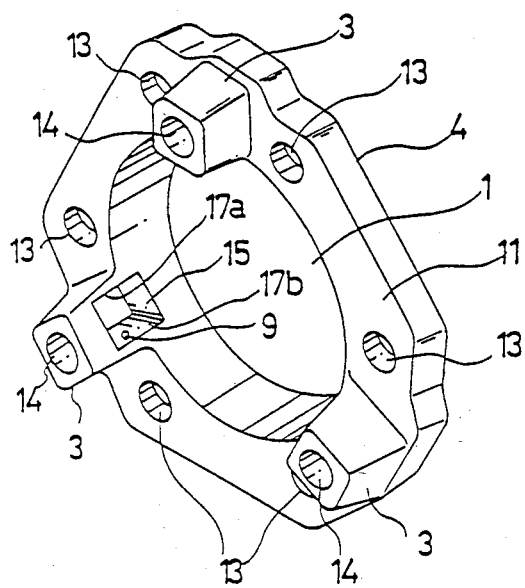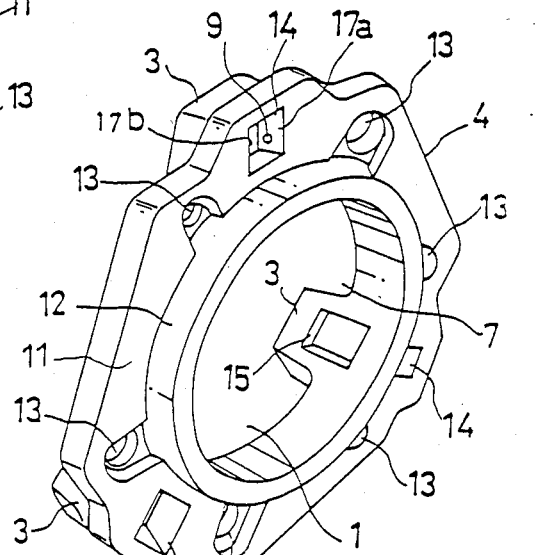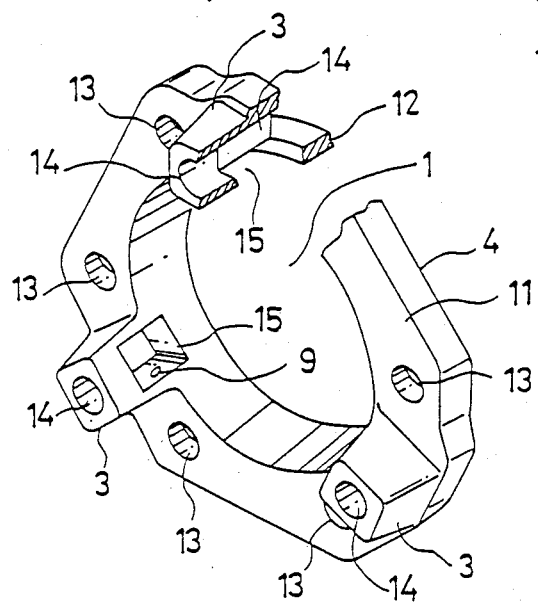

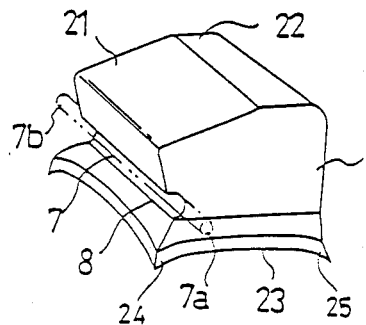
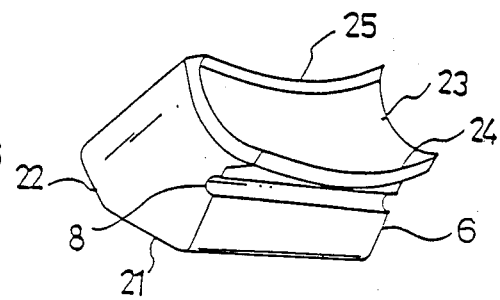
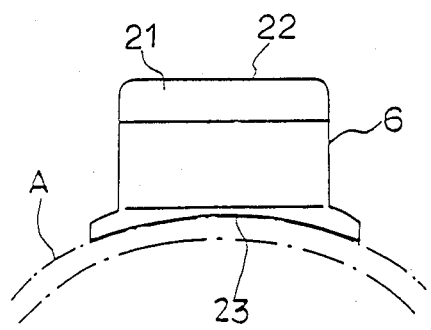
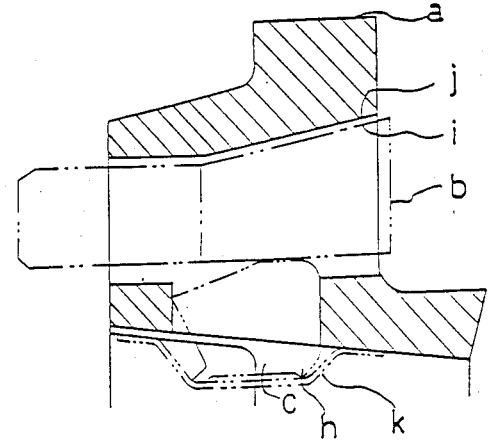
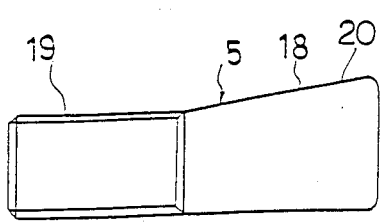
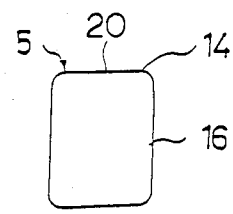

RETAINER RING FOR COUPLING TOGETHER WATER SUPPLY PIPES OR THE LIKE

FIELD OF THE INVENTION

This invention relates to a retainer ring, which is used to couple together underground water or gas supply pipes while preventing the dislocation of the coupled pipes and maintaining the water tightness of the pipe joint of pipes.

PRIOR ART

Pipes such as water supply pipes are usually coupled together in a manner as shown in FIG. 15.

In this case, a retainer ring C and a rubber waterproof ring D are first fitted on an end portion B of a pipe A to be coupled. The end portion B of the pipe A then is inserted into a flanged end portion F of another pipe E. The retainer ring C and the flange G of the other pipe E are then secured together by bolts H and nuts I. At this time, the water-proof ring D is forced into the flanged end portion E by an axial extension J of the retainer ring C, thus attaining the water tightness of the joint of the two pipes.

By merely tightening the nuts I on the bolts H, however, the end portion B of the pipe A and the flanged end portion F of the other pipe E cannot be sufficiently secured together, and dislocation of the pipe A is liable due to an earthquake, a land subsidence or an externally applied load such as pressure.

To prevent such a dislocation, it has been in usual practice to urge the end portion B of the pipe A directly with an end of a push bolt L, which is screwed into a bolt insertion section K of the retainer ring C in a direction at an angle to the axis of the pipe, as shown in FIG. 15.

It is also in usual practice to screw a push bolt L into a bolt insertion section K of a retainer body C at right angles to the pipe axis, as shown in FIG. 16, to urge a retaining piece M with the end of the push bolt L and urge the end portion B of the pipe A with the piece M.

It is further in usual practice to screw a push bolt L into a bolt insertion section L of a retainer ring at an angle to the pipe axis, as shown in FIG. 17, to urge a piece M with the end of the push bolt L and urge the end portion B of the pipe A with the piece M.

PROBLEMS IN THE PRIOR ART

The arrangement shown in FIG. 15, however, has the following problems. Since the pipe A is directly urged by the end of the push bolt L, the urging force is weak.

In addition, since the pipe A is urged directly by the end of the push bolt L, strongly tightening the push bolt L would result in a highly concentrated force applied to the urged portion of the pipe A, so that damage is likely to the pipe A.

Further, since the push bolt L is screwed in a direction at an angle to the pipe axis, it is liable to be flexed by vibrations or shocks.

The arrangement shown in FIG. 16 has the following problems.

This arrangement can provide a stronger urging force compared to the case of FIG. 15 because the pipe A is urged via the piece M urged by the push bolt L, and also the push bolt is less likely to be flexed by vibrations or shocks. However, when a force tending to dislocate the pipe A is applied to the pipe A, the piece M is moved to a position shown by a dashed line, so that the push bolt L is liable to be flexed.

In addition, since the push bolt L is screwed at right angles to the pipe A, it is necessary that the diameter of the gutter or hole formed in the ground to bury the pipe A be considerably greater than the outer diameter of the pipe A. Otherwise, the hands or tools would touch the wall of the ground hole when tightening the bolt L. Particularly, to tighten the push bolt on the lower portion of the pipe A, the hand has to be extended to the lower portion of the pipe A. In this case, the bolt tightening operation is very difficult if the diameter of the ground hole is small. Increasing the ground hole diameter to obviate such an inconvenience requires a great deal of digging.

The arrangement shown in FIG. 17 can provide strong urging force compared to the case of FIG. 15 because the pipe A is urged via the piece M, and also the push bolt L is less likely to be flexed by vibrations or shocks. However, since the engagement surface N of the piece M in contact with the pipe A is not curved, as shown in FIG. 18, if the width of the piece M is increased and shown by phantom lines, end portions Ma and Mb of the piece in the width direction will not be in contact with the outer periphery of the pipe A. Therefore, there is a limination on the effective width of the piece M, so that the urging force cannot be increased so much.

In a further aspect, the joint of pipes is sometimes covered by a polyethylene cover or the like to prevent corrosion of the joint or prevent intrusion of waste water or rainwater. With the arrangements shown in FIGS. 15 to 17, where the push bolt L projects outwardly from the pipe A, the cover is likely to be broken, so that the purpose of prevention of corrosion or prevention of intrusion of waste water or like can not be sufficiently attained.

OBJECTS OF THE INVENTION

A primary object of the invention is to provide a retainer ring, which can be readily secured to the coupled pipe by an easy coupling operation.

A second object of the invention is to provide a retainer ring, with which a force applied to the coupled pipe and tending to dislocate the pipe is converted to a force tending to prevent dislocation of the pipe, thus preventing the dislocation of the pipe.

A third object of the invention is to provide a retainer ring, which has pieces capable of being readily held in contact with the outer periphery of the coupled pipe.

A fourth object of the invention is to provide a retainer ring, in which the pieces can be conveniently retained in a ring body.

SUMMARY OF THE INVENTION

The retainer ring according to the invention, as shown in FIGS. 1 to 14, comprises a ring body 4 fitted on a pipe A, a plurality of push bolts 5, a plurality of retaining pieces urged against the pipe A by the respective push bolts 5 and retainers 7 for retaining the pieces 6 in the respective piece accommodation spaces 15.

With the retainer ring according to the invention, by tightening a nut 28 fitted on a threaded portion 19 of each push bolt 5 as shown in FIG. 6, the push bolt 5 is pulled to the left in FIG. 6. As a result, the push bolt 5 is forced inwardly by the engagement between an inclined engagement surface 20 of the push bolt 5 and an inclined engagement surface 16 of a push bolt insertion hole 14. The retaining piece 6 is thus urged against the pipe A by the push bolt 5, whereby the ring body 4 is secured to the pipe A.

Further, with the retainer ring according to the invention, a force applied to the pipe A in the direction of dislocating the pipe will cause each retaining piece 6 to be turned such that a ridge-shaped edge 15 thereof wedges into the pipe A, thereby preventing the dislocation of the pipe A.

Further, with the retainer ring according to the invention the bottom 23 and ridge-shaped edges 24 and 25 of each piece 6 urged against the pipe A have curved shapes conforming to the outer periphery of the pipe A so that the edges 24 and 25 can be held in close contact with the outer periphery of the pipe A.

Further, with the retainer ring according to the invention each piece 6 is retained by a retainer in each piece accommodation space 15.

BRIEF DESCRIPTION OF THE DRAWINGS

FIG. 1 is a perspective view showing the front side of a ring body of a retainer ring according to the invention;

FIG. 2 is a perspective view showing the rear side of the ring body;

FIG. 3 is a perspective view, partly broken away, showing the ring body;

FIG. 9 is a perspective view showing the front side of a retaining piece;

FIG. 10 is a perspective view showing the rear side of the piece;

FIG. 11 is a view for explaining the state of contact between the piece and pipe;

FIG. 12 is a side view showing a push bolt;

FIG. 13 is a back view showing the push bolt;

FIG. 14 is a view for explaining a state where a piece is secured to a ring body by an adhesive tape;

DESCRIPTION OF THE PREFERRED EMBODIMENT

Figure 4:
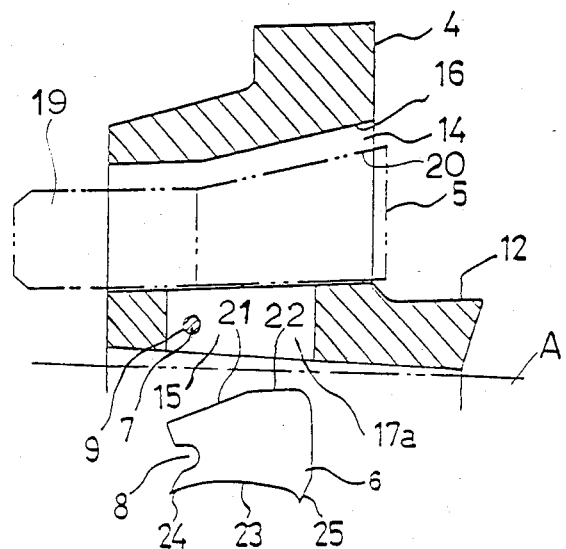
FIG. 4 is an axial sectional view, to an enlarged scale, showing the ring body before mounting a retaining piece.

The retaining ring according to the invention, as shown in FIGS. 1 to 4, comprises a ring body 4 to be fitted on a pipe A, bolts 5, retaining pieces 6 urged against the pipe A by bolts 5, and retainers for retaining the pieces 6 in piece accommodation spaces 15.

The ring body 4, as shown in FIG. 1, has a radial portion 11 having a central pipe insertion hole 1, which is penetrated by the pipe, and an axial portion 12 extending from the inner edge of the radial portion 11. The radial portion 11 has a plurality of radially uniformly spaced-apart coupling bolt insertion holes 13. The radial portion 11 also has a plurality of radially uniformly spacedapart axial projections 3 projecting from the front side, i.e., the pipe insertion side, and each between adjacent coupling bolt insertion holes 13.

Figure 5:
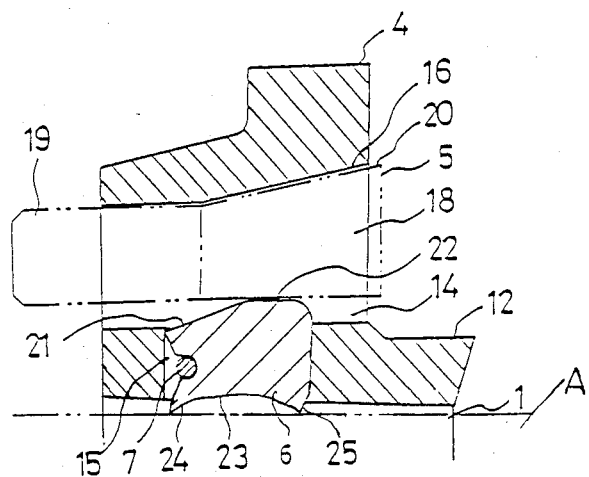
FIG. 5 is a view similar to FIG. 5 but showing the ring body after the retaining piece has been mounted.

As shown in FIGS. 4 and 5, each axial projections 3 has a push bolt insertion hole 14 for receiving a push bolt 5 and a piece accommodation space 15 for receiving a retaining piece 6.

As clearly shown in FIGS. 3 and 4, the push bolt insertion hole 14 extends in the direction of insertion of the pipe A and has an inclined engagement surface 16 inclined inwardly toward its front end (i.e., toward the left in FIG. 4).

As clearly shown in FIGS. 3 and 4, the piece accommodation space 15 communicates with the push bolt insertion hole 14 and the central hole 1. As shown in FIGS. 1 and 4, opposite side walls 17a and 17b of the piece accommodation space 15 are formed with respective circular bores 9. End portions 7a and 7b of the retainer 7 projecting from the opposite ends of a groove 8 of the piece 6, as shown in FIG. 9, are received in the bores 9. While the bores 9 are circular in sectional profile in the case of FIG. 1, their shape or configuration may be suitably selected to suit the shape of the retainer 7.

As shown in FIGS. 12 and 13, the push bolt 5 has a rectangular piece urging portion 18 and a threaded portion 19 extending from the portion 18. The piece urging portion 18 has an engagement surface 20 which is inclined so that it can engage with the inclined engagement surface 16 of the push bolt insertion hole 14.

The piece 6 is most clearly shown in FIG. 9. As is shown, its top has an inclined surface 12 on the left side (i.e., on the pipe insertion side) and a parallel surface 22 on the other side to the pipe axis.

The bottom of the piece 6, as shown in FIG. 10, has front and rear sharp ridge-like edges 24 and 25, which have curved shapes conforming to the outer periphery of the pipe A so that they can be readily brought into contact with the pipe outer periphery.

Figure 6:
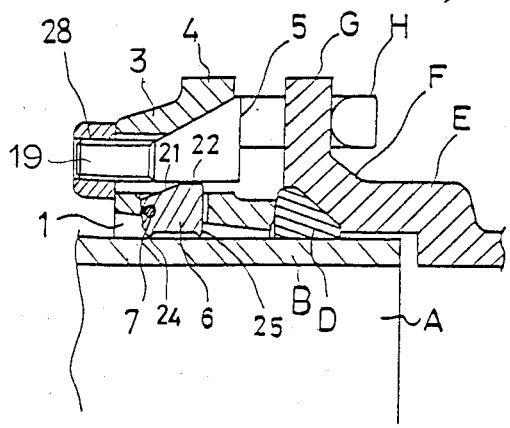
FIG. 6 is an axial sectional view showing the retainer ring before the retaining piece is turned.

As shown in FIGS. 5 and 6, the piece 6 is normally supported by three-point contact support with its horizontal top surface 22 in contact with the push bolt 5 and its edges 24 and 25 in contact with the outer periphery of the pipe A.

The front of the piece 6 is formed with a groove 8 open to the front, as shown in FIG. 9. The retainer 7 can be received in the groove 8.

The retainer 7 may be made of a flexible soft plastic material or the like and is in the form of a round rod, an angular rod, a round tube, an angular tube, etc.

EXAMPLE OF USE OF RETAINER RING ACCORDING TO THE INVENTION

The retainer ring according to the invention is used in the following manner.

Preliminarily, the push bolt 5 is inserted into each push bolt insertion hole 14, and the end portions 7a and 7b of the retainer 7 are inserted into the bores 9 formed in the opposite side walls 17a and 17b of each piece accommodation space 15, as shown in FIG. 4. Then, each piece 6 is pushed into the piece accommodation space 15 such that the retainer 7 is received in its groove 8 so that it is regularly held in the piece accommodation space 12, as shown in FIG. 5.

Thereafter, an end portion B of the pipe A is inserted into the central pipe insertion hole 1 of the ring body 4. Then, a water-proof ring D made of rubber is fitted on the end portion B of pipe, and then the end portion B is inserted into a flanged end portion F of another pipe E. A coupling bolt H is then inserted through each coupling bolt insertion hole 13 of the ring body 4 and a corresponding coupling bolt insertion hole in the flange G of the flanged end E. Subsequently, a nut (not shown) is fitted on each bolt H and tightened, thus completing the coupling of the pipes A and E. At this time, the water-proof ring D is pushed into the flanged end portion F of the pipe E by the axial portion 12 of the ring body 4, thus providing for water tightness of the joint.

Subsequently, a nut 28 fitted on each push bolt 5 is tightened, thus pulling the push bolt 5 to the left in FIG. 6. In consequence, the push bolt 5 is urged inwardly by the engagement surface 16 of the push bolt insertion hole 14. The push bolt 5 thus pushes the right side top surface 22 of the piece 6. The edges 24 and 25 of the piece 6 are thus urged against the outer periphery of the pipe A.

Figure 7:
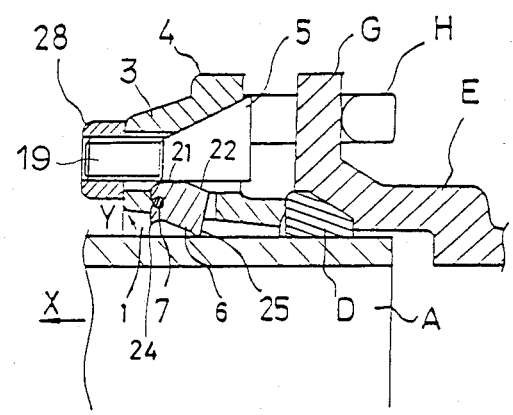
FIG. 7 is a view similar to FIG. 6 but showing the retainer ring after the retaining piece has been turned.
Figure 8:
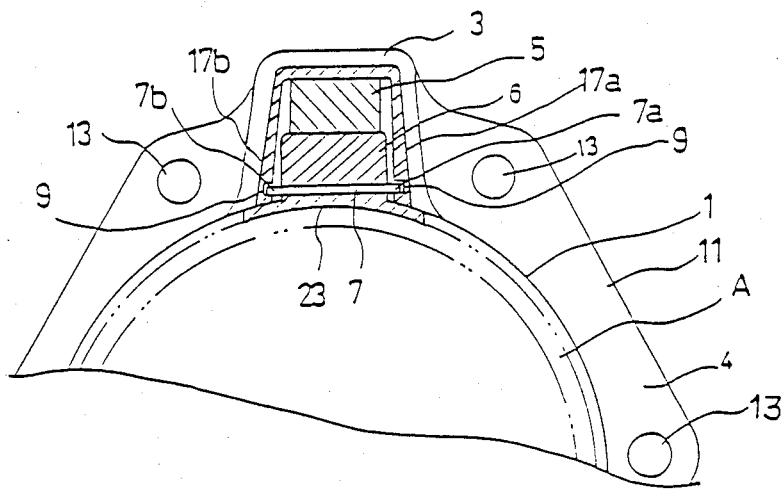
FIG. 8 is a front view, partly in section, showing the retainer ring with a retaining piece mounted in the ring body.

When the pipe A in the state shown in FIG. 6 is moved even slightly in the direction of arrow X shown in FIG. 7 by the water pressure, the pipe 6 which is supported by the three-point contact surface is turned about the right side edge 25 in the direction of arrow Y, so that the left side top surface 21 of the piece 6 is brought into forced contact with the push bolt 5. Thus, when a further dislocating force is applied to the pipe A, the edge 25 wedges into the pipe A, so that the pipe A can no longer be moved in the direction of arrow X.

EFFECTIVENESS OF THE INVENTION

The retainer ring according to the invention has the following effectiveness.

(1) The pipe A is urged not directly by the push bolt 5 but is urged via the piece 6, so that a strong urging force can be applied to the pipe A.

Figure 15:
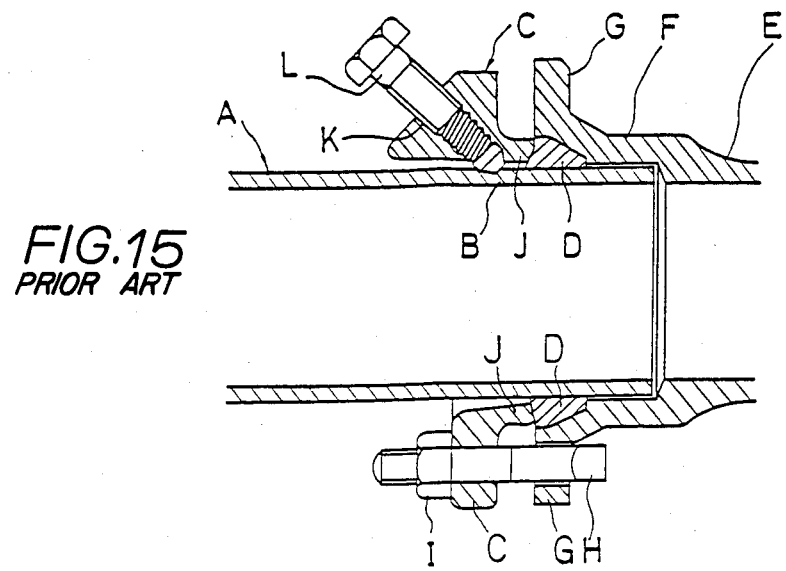
FIGS. 15 to 17 are views showing prior art retainer rings.
Figure 16:
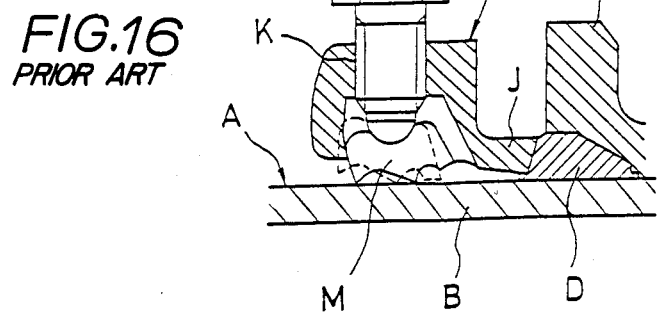
Figure 17:
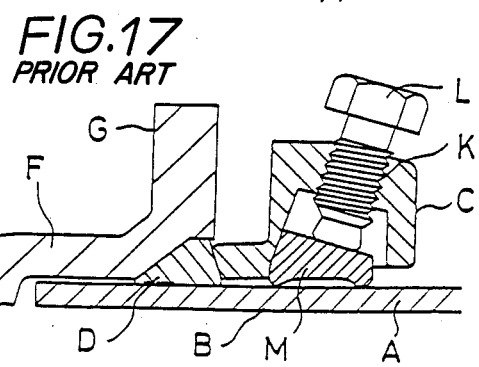
Figure 18:
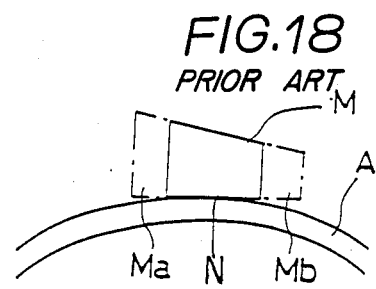
FIG. 18 is a view for explaining the state of contact between a piece and a pipe in the arrangement shown in FIG. 17.

(2) Since the engagement surface 20 of the push bolt 5 and the engagement surface 16 of the push bolt insertion hole 14 are both inclined with respect to the axis of the pipe, a very strong urging force can be applied. Therefore, the push bolt 5 is less easily flexed by oscillations or other external forces applied to it, so that the piece 6 can apply a steady urging force. The urging force obtained with the retainer ring according to the invention and the urging force obtained with the prior art retainer ring shown in FIG. 5 were compared to find that the retainer ring according to the invention can provide approximately four times the urging force provided by the retainer ring shown in FIG. 15.

(3) Since the piece 6 is normally supported by the three-point contact support between the push bolt 5 and pipe A, even a slight movement of the pipe A in the dislocating direction will cause the piece 6 to be turned so that the edge 25 thereof wedges into the pipe A. Thus, the dislocation of the pipe A can be reliably prevented. Besides, the greater the dislocating force applied to the pipe A the more the edge 25 is wedged into the pipe A, thus enhancing the reliability of prevention of the dislocation.

(4) Since the pipe A is pushed via the piece 6, local forces are less likely to be applied to the pipe A, thus reducing damage to the pipe A.

(5) Since the urging force that can be provided is strong, the pipe A can be pushed sufficiently without need of excessively increasing the force applied to the pipe A by the piece 4. It is thus possible to eliminate irrational force applied to the pipe A, thus reducing the possibility of distortion of the pipe A and damage thereto.

(6) Because of the strong urging force provided, the urging force per push bolt need not be so strong. The push bolt 5 thus may have a small diameter. This means that the cost and weight of the push bolt 5 can be reduced.

(7) Because of the strong urging force provided, the number of the push bolts 5 can be reduced, thus reducing the number of projections 3. The ring body 4 thus can be reduced in price and also in weight to make the pipe coupling operation easier.

(8) Since the push bolt insertion hole 14 extends in the direction of insertion of the pipe A, the nut 28 fitted on the push bolt 5 may be tightened without touching the wall of the pipe gutter or hole with hand. That is, the operation of tightening the nut 28 can be facilitated. Further, the pipe hole may have a diameter only slightly greater than the diameter of the pipe A, thus making the formation of the pipe hole easier and reducing the construction cost.

(9) Since the edges 24 and 25 of the piece 6 have curved shapes conforming to and to be in close contact with the outer periphery of the pipe A, the urging force can be further increased. Further, even if the dimension of the bottom 23 of the piece 6 in the circumferential direction of the pipe A is increased, the edges 24 and 25 may be made to be in close contact with the outer periphery of the pipe A. Thus, the contact area can be increased, and the outer periphery of the pipe A can be reliably urged. Further, by increasing the contact area, the local forces applied to the pipe A can be reduced to reduce damage to the pipe A.

(10) Since the pipe 6 is held in the ring body 4 by the retainer 7, the piece 6 can be held very readily and reliably. Further, since there is no need of taking out the retainer 7 before insertion of the pipe A through the pipe insertion hole 1, there is no need of holding the piece 6 with a finger when inserting the pipe A. The pipe A thus can be readily inserted through the pipe insertion hole 1. If the retainer 7 is not provided, the piece c is held attached to the ring body with an adhesive tape k as shown in FIG. 14. In this method, the piece c has to be held with fingers while it is attached to the ring body with the adhesive tape. This operation is very cumbersome. In addition, when the piece c is urged by the push bolt b while it is held attached to the ring body by the adhesive take k, the tape k is clamped between the pipe A and piece c, resulting in insufficient urging of the piece c against the pipe A. That is, it is necessary to separate the adhesive tape. According to the invention, such an operation is not needed at all.

What is claimed is:

1. A retainer ring for coupling together water supply pipes or the like comprising,
   a ring body having a pipe insertion hole and a pipe insertion side, a plurality of coupling bolt insertion holes, a plurality of push bolt insertion holes and a corresponding number of retaining piece accommodation spaces each being contiguous with and radially inwardly of said push bolt insertion holes, push bolts each inserted into each said push bolt insertion hole and having a threaded portion extending through said body pipe insertion side, a nut diametrically larger than said push bolt insertion hole threadingly engaged with said push bolt threaded portion, a corresponding plurality of retaining pieces each inserted into a corresponding retaining piece accommodation space, and retainers for retaining said respective retaining pieces in said retaining piece accommodation spaces, each said push bolt insertion hole having an inclined engagement surface inclined outwardly with respect to the axis of the inserted pipe from the pipe insertion hole, each said push bolt having an inclined engagement surface of engagement with said inclined engagement surface of the push bolt insertion hole and an opposite axially extending flat surface for engagement with the top of said retaining piece, said push bolt inserted in said push bolt insertion hole being pulled toward the pipe insertion side by tightening said nut fitted on said push bolt against said pipe insertion side of said body, each said piece being urged by the associated push bolt against the pipe inserted in said pipe insertion hole when said push bolt is pulled toward the pipe insertion side, said top of said piece having an inclined surface inclined inwardly with respect to the axis of the inserted pipe toward the pipe insertion side and a surface parallel to the pipe axis on the other side, the bottom of said piece having two ridge-like edges, said bottom and said two edges of said piece having curved shapes conforming to the outer periphery of the inserted pipe, said piece having a retainer holding section formed on the pipe insertion side, said ring body having retainer receiving sections for receiving said retainers.

* * * * *